United States Patent Office 2,908,124
Patented Oct. 13, 1959

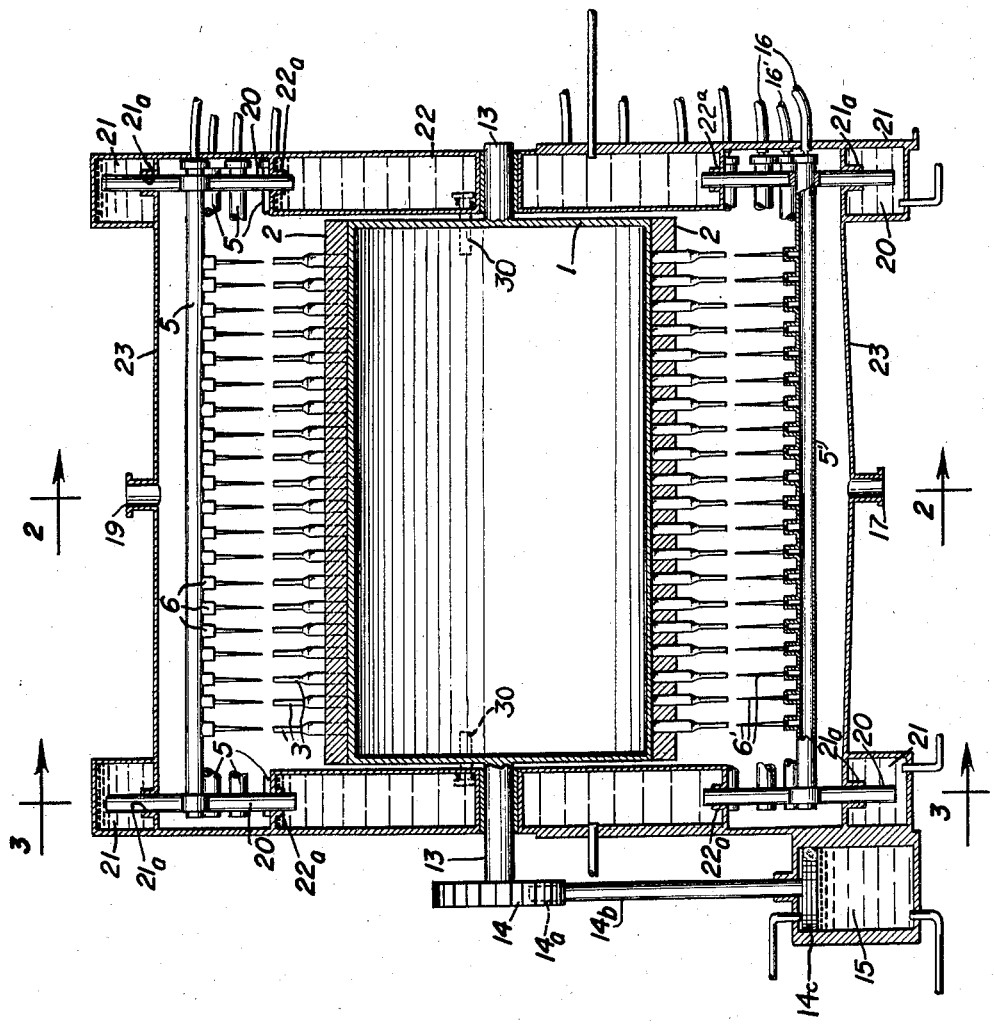

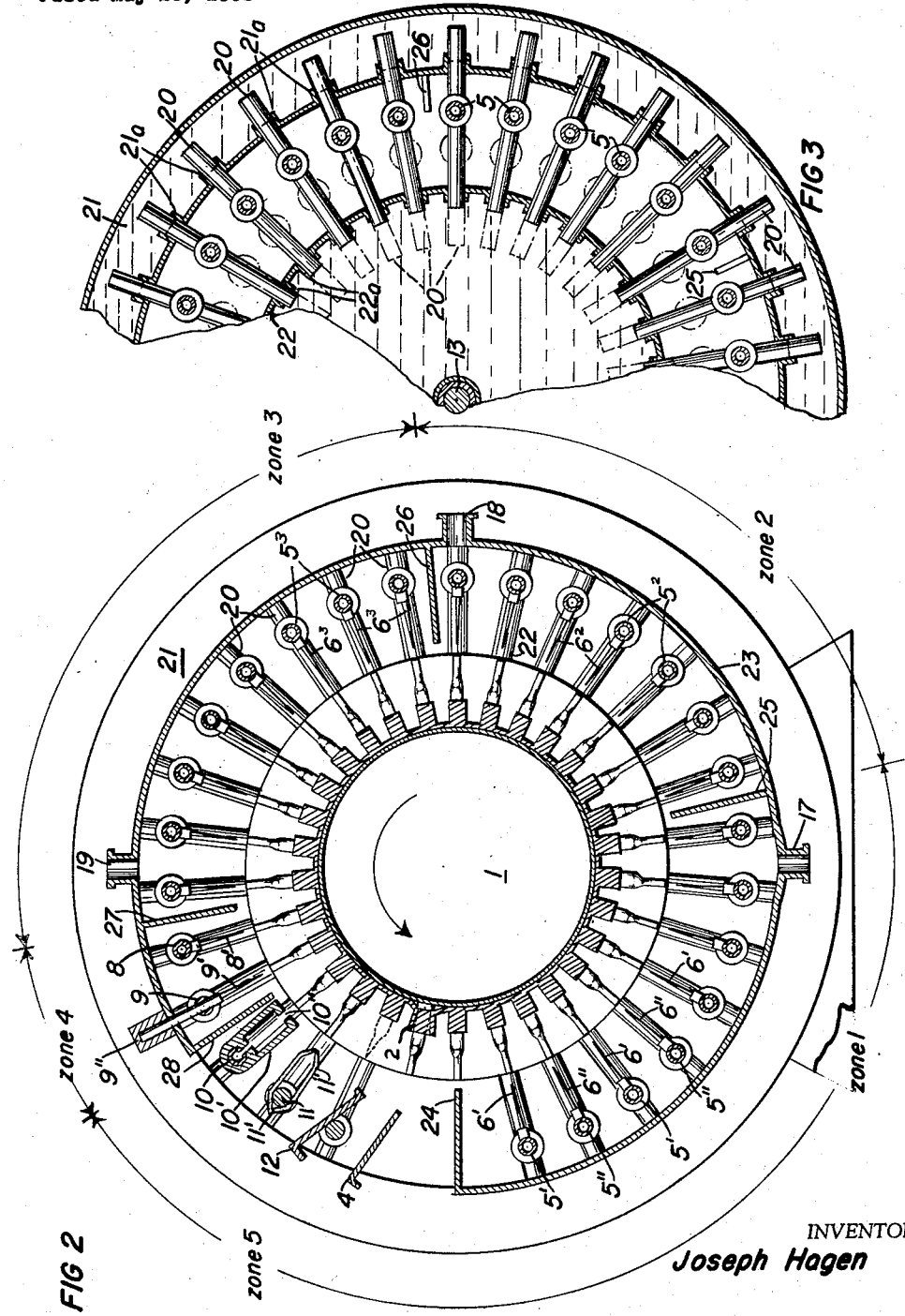

2,908,124

APPARATUS FOR HANDLING AMPOULES

Joseph Hagen, Birsfelden, Baselland, Switzerland, assignor to Sandoz Ltd., Basel, Switzerland, a Swiss firm Application May 28, 1958, Serial No. 738,466

Claims priority, application Switzerland June 6, 1957

7 Claims. (Cl. 53—112)

The present invention relates to a method and apparatus for handling ampoule type containers for pharmaceutical preparations and the like during the washing, drying, sterilizing, filling and sealing operations thereof.

Usually during the treatment of ampoule type containers for pharmaceutical preparations during their preparation for filling and their actual filling, they must first be washed, usually by the introduction of washing liquid into the ampoules which is in turn followed by the introduction of air to remove the washing liquid from the ampoules or flasks. The ampoules are then dried and sterilized by the introduction of hot air or the like, and then cooled by the introduction of cool air. They are then treated to remove the air therefrom, the air being replaced by an inert gas, following which they are filled with the pharmaceutical and then sealed. Each of these operations usually takes place in a different machine or apparatus, the groups of ampoules being treated being transported from one device to the other by hand or by automatic conveyor means. In situations where manual transport is employed, labor costs add greatly to the cost of filling the ampoules, while in the instances in which automatic conveyor apparatus is used, the space for the machinery necessary to treat and fill the ampoules plus the space for the conveyor apparatus makes the space requirements unduly great.

It is an object of the present invention to provide a method and apparatus for the treatment of ampoule type containers preparatory to filling them and for actually filling them in which the entire sequence of operation may be performed at a single location, thus eliminating the necessity of having manual labor for transporting them between separate machines for performing the different operations and at the same time eliminating the necessity for large areas for the various machines for performing the different operations and the conveyor apparatus for automatically conveying the ampoules between such machines.

Other and further objects of the invention will become apparent from the following specification and claims taken together with the accompanying drawings in which Fig. 1 is a sectional elevation view of a machine for carrying out the present invention;

Fig. 2 is a sectional view along line 2—2 of Fig. 1; and

Fig. 3 is a sectional view along line 3—3 of Fig. 1.

The method according to the present invention comprises positioning ampoules in a plurality of rows, the rows being at equal radial distances around a horizontal axis, and being parallel thereto. The rows of ampoules are moved around the axis through a plurality of circumferential zones in a succession of movements. Each movement is through a circumferential distance which is equal to a space between adjacent rows. After each movement, wash fluid is injected into the ampoules in alternate rows which are then present in the first of the zones. Simultaneously, gas is injected into the ampoules in the remaining rows in the first zone for removing the wash fluid from these ampoules. Simultaneously with the injections taking place in the first zone, hot gas is injected into the ampoules in the rows of ampoules in the second zone. Simultaneously, cold gas is injected into the ampoules in the rows of ampoules in the third zone. Each of these injections takes place after each movement of the rows, so that successive rows are treated at each treating position. Simultaneously with these injections, inert gas is injected into the ampoules in the first row of ampoules in the fourth zone after each movement, and simultaneously therewith, the material with which the ampoules are to be filled is injected into the ampoules in the next row in the fourth zone, this injection again taking place after each movement of the rows. Simultaneously, the necks of the ampoules in the row of ampoules in the zone next after the fourth zone are sealed, and the ampoules in the row after this row of ampoules being sealed are removed after each movement. Thus, the entire plurality of rows is each being acted upon after each movement of the rows, so that successive rows are treated at the different points around the horizontal axis.

The apparatus for carrying out the method of the present invention comprises a cylinder 1 which is rotatably mounted about its cylindrical axis on stub shafts 13 which are attached to the ends of the cylinder. Mounted on the outside of the cylinder 1 are a plurality of holding members 2 each of which holds a row consisting of a plurality of ampoules 3 or the like. These ampoule row holding members 2 extend parallel to the axis of the cylinder 1. They are openable to receive the ampoules therebetween, after which they close, holding the row of ampoules in position. For example they may be resiliently mounted on the cylinder 1 and wedge means 30 may be inserted between them to open them.

Spaced outwardly of the cylinder 2 and circumferentially positioned around the cylinder are a plurality of supporting members 5. The ends of these supporting members 5 are carried on radially extending piston rods 20. The outer ends of the piston rods 20 extend into an outer annular hollow cylinder member 21, the piston rod 20 being in liquid tight sliding relationship with the annular hollow cylinder member 21 at the apertures 21a through which they extend into the annular hollow cylinder member. The inner ends of the piston rods 20 extend into an inner annular hollow cylinder member 22 in the same manner through apertures 22a. The piston rods extend radially of the cylinder 1, and the pisotn rods and annular hollow cylinder members together with means for causing pressure fluid to flow into and out of said members constitute means for reciprocating the supporting members 5 radially toward and away from the cylinder 1. Wedge means 30 may also be in the form of a piston slidable into and out of inner annular hollow cylindrical member 22.

A casing 23 extends around slightly greater than ¾ of the periphery of the cylinder 1 and is spaced radially outwardly of the cylinder 1. Partitions 24—28 extend radially inwardly from the casing 23 to a point near the cylinder, leaving space for a row of ampoules to pass, and they divide the casing into a plurality of zones. In the form of the apparatus shown there are four such zones, partitions 24 and 25 defining zone 1, partitions 25 and 26 defining zone 2, partitions 26 and 27 defining zone 3, and partitions 27 and 28 defining zone 4. In each of these zones there is a plurality of supporting members 5. There is an outlet 17 in casing 23 from zone 1, an outlet 18 in casing 23 from zone 2 and an outlet 19 in casing 23 from zone 3. In the embodiment shown, zone 1 extends from a point laterally of the axis of the cylinder 1 to a point just past a point vertically below the axis of cylinder 1. Outlet 17 is positioned vertically below the axis of the cylinder 1. The purpose of this construction will be explained.

Mounted on every other supporting member 5' in zone 1, beginning with supporting member 5' which is closest to the partition wall 24, are a plurality of wash fluid injecting members 6' corresponding in number to the number of ampoules in each of the ampoule row holding members 2. The supporting members 5' are in the form of headers to which the injecting members 6' are connected. The ends of the headers are connected to wash fluid conduits 16 which in turn are connected to a source of wash fluid (not shown). Each of the remaining supporting members 5'' in zone 1 have mounted thereon a plurality of gas injecting members 6'' likewise corresponding in number to the number of ampoules in a row. These supporting members are also in the form of headers which are connected to gas conduits 16' in the same manner as headers 5' are connected to conduits 16, and the gas conduits in turn are connected to a source of gas (not shown).

Mounted on the supporting members $5^2$ in the zone 2 are a plurality of hot gas injecting members $6^2$ the same in number as the number of ampoules in a row, and the supporting members in zone 2 are in the form headers which are connected to a hot gas conduit (not shown) in the same manner as the headers 5' are connected to the wash fluid conduit 16. These hot gas conduits are in turn connected to a source of hot gas (not shown).

The supporting members $5^3$ in zone 3 have mounted thereon cold gas injecting members $6^3$ corresponding in number to the number of ampoules in a row, and these supporting members are in the form of headers which are connected to a cold gas conduit (not shown) in the same manner as headers 5' are connected to the wash fluid conduit 16, and the cold gas conduit is in turn connected to a source of cold gas.

The supporting member 8 next adjacent to the partition 27 in zone 4 has mounted thereon a plurality of gas injecting members 8' the same in number as the number of ampoules in a row, and the supporting member 8 is in the form of a header which is connected to an inert gas conduit (not shown) in the same manner as the wash fluid conduits, and the inert gas conduit is connected to a source of inert gas (not shown).

The other supporting member 9 in zone 4 has mounted thereon a plurality of liquid injecting members 9' corresponding to the number of ampoules in a row, and the supporting member 9 is in the form of a header which is connected through a conduit (not shown) to a source of liquid pharmaceutical (not shown). The pharmaceutical injecting members 9' may have associated with them a conventional dosing means 9'' for measuring a predetermined amount of liquid for injection from the injecting members 9'.

Next adjacent to the partition 28 defining the end of zone 4, and first in order in the zone between partition 28 and partition 24, which zone may be designated zone 5, is a supporting member 10 which has mounted thereon a plurality of gas burner members 10', one for each ampoule in a row, each of which has a plurality of spaced opposed gas burning nozzles 10'' on the end thereof closest to the cylinder 1, the nozzles 10'' being spaced from each other sufficiently to admit the neck of an ampoule between them. The supporting member 10 is in the form of a header which is connected by conduit means (not shown) to a source of fuel gas (not shown).

Next adjacent to the supporting member having the gas burner members 10' thereon is a supporting member 11 having a plurality of ampoule grasping members 11' thereon, likewise the same in number as the number of ampoules in a row, each of which comprises a plurality of arms 11'' which extend toward the cylinder 1, and which act to grasp the neck of an ampoule for removing it from the ampoule row holders 2 on the cylinder 1. Immediately adjacent the supporting member 11 is a conveyor member 12 for conveying filled and sealed ampoules deposited therein by the ampoule grasping members 11' away from the apparatus. In order to facilitate withdrawal of the ampoules, an additional wedge means 30 may be provided to spread the ampoule row holding members 2.

Next adjacent to the conveyor 12 is a loading member 4 for supplying untreated ampoules to be inserted into the ampoule row holding members 2 on the cylinder 1.

On the end of one of the stub shafts 13 is a gear 14, and meshed with the gear 14 is a ratchet means 14a mounted on a piston rod 14b, which in turn extends into a cylinder 15 and has on the end thereof a piston 14c which slides in the cylinder 15. One side of the cylinder 15 is connected to a source of fluid pressure and the other end of the piston 15 is likewise connected to a source of fluid pressure (not shown) by a valve means which permits introduction of pressure fluid into either end of the piston 15. Each of the annular hollow cylinder members is similarly connected to a source of pressure fluid by a valve arrangement (not shown) which permits introduction of pressure fluid into either the inner annular hollow cylinder member 22 or the outer annular hollow cylinder member 21.

The operation of the device commences with the loading of a row of ampoules into the ampoule row holding members 2. The row holding members are spread slightly apart and the ampoules inserted along the ampoule loading member 4. The ampoule row holding members 2 are then permitted to close on the row of ampoules. Pressure fluid is then admitted to the end of cylinder 15 away from gear 14 to move gear 14 and rotate the cylinder 1 a distance sufficient to move the next ampoule holding members 2 into position in front of the ampoule loading member 4. This operation continues until a row of ampoules is positioned beneath the first supporting member 5' in zone 1. At this point, after the cylinder 1 has been rotated, pressure fluid is admitted to outer annular hollow cylinder member 21, and the piston rods 20 are moved radially inwardly, thus moving the wash fluid injecting members 6' into the ampoules positioned radially inwardly of them. Wash fluid from the header forming the supporting member 5' is thus introduced into the ampoules for the purpose of washing them. Pressure fluid is then introduced into the inner annular hollow cylinder member 22 and the piston rods 20 are moved radially outwardly withdrawing wash fluid injecting members 6' from the ampoules. The cylinder 1 is again rotated, thus moving the first row of ampoules beneath gas injecting members 6'' on the second supporting member 5'' in zone 1. The operation of radially reciprocating supporting members 5 is again repeated, and in this operation the air injected through gas injecting members 6'' ejects the wash fluid from the ampoules. The remaining stages of treatment in zone 1 alternate injecting and removal of wash fluid which drains out of the casing 23 in zone 1 through the outlet 17 by gravity. The sequence of operations is continued, and in zone 2 hot gas dries and sterilizes the ampoules, while in zone 3 cool gas cools the ampoules. In each instance the gas escapes from the casing through outlets 18 and 19 respectively.

In the first operation in zone 4, inert gas is introduced into the ampoules thus forcing the air out of them, while in the second operation a measured amount of liquid pharmaceutical is inserted into the ampoule, forcing part of the inert gas out. In each instance, the injecting members are moved toward and into the ampoules, the injection operation is performed, and the injecting members are withdrawn and the cylinder 1 is indexed to bring the next row of ampoules underneath the injectors.

At the first position in zone 5, the necks of the ampoules are sealed by the gas burner members 10' and in the second position they are grasped by the ampoule grasping members 11' and withdrawn from the ampoule row holders 2. At this point, the means for operating the ampoule row holder members may be actuated to spread them.

It will be seen that when the first row of ampoules reaches a position beneath conveyor member 12, the entire drum is filled with rows of ampoules, each row of injecting members is functioning on a row of ampoules, and a continuous series of rows of ampoules is being inserted from loading member 4 while a continuous series of rows of ampoules filled and sealed is being removed and placed on conveyor 12.

It will be obvious that the number of treating stages and supporting members with the proper injecting members thereon can be varied from zone to zone, and the number and size of the zones can be varied. Likewise, the types of material supplied to the injecting members may be varied to give the proper preliminary and filling treatment to the ampoules.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. Apparatus for processing groups of ampoules comprising a cylinder rotatably mounted about its cylindrical axis, a plurality of ampoule row holding members mounted on the circumference of said cylinder, a plurality of supporting members circumferentially positioned around said cylinder and spaced radially from said cylinder and each extending parallel to the surface of said cylinder in a position corresponding to one of said ampoule row holding members, reciprocating means on which said supporting members are mounted for reciprocating said supporting members radially toward and away from said cylinder, a casing around said supporting members spaced radially outwardly thereof, partitions extending radially inward from said casing to adjacent said cylinder dividing said casing circumferentially into a plurality of zones each having a plurality of supporting members therein, each of said zones having an outlet therefrom, a plurality of wash fluid injecting members mounted on at least the supporting member at one end of the first of said zones, there being one injecting member for each position in which an ampoule is held in said ampoule row holding members, conduit means connected to said wash fluid injecting members for supplying wash fluid thereto, a plurality of gas injecting members on each of the remainder of the supporting members in the first of said zones, there being one gas injecting member for each position in which an ampoule is held in said ampoule row holding member, gas conduit means connected to said gas injecting members for supplying gas thereto, a further plurality of gas injecting members on the supporting members in the second and third of said zones, there being one injecting member for each position in which an ampoule is held in said ampoule row holding members, hot gas conduit means connected to said gas injecting members in the second of said zones, cold gas conduit means connected to said gas injecting members in the third of said zones, a still further plurality of gas injecting members on the supporting member at the corresponding end of the fourth of said zones, there being one gas injecting member for each position in which an ampoule is held in said ampoule row holding members, inert gas conduit means connected to said still further plurality of gas injecting members, a plurality of liquid injecting means on another supporting member in the fourth of said zones, there being one liquid injecting member for each position in which an ampoule is held in said ampoule row holding members, a plurality of ampoule sealing means on a supporting member at the corresponding end of the zone adjacent said fourth zone, there being one sealing means for each position in which an ampoule is held in said ampoule row holding members, a plurality of ampoule removing members on another supporting member adjacent the supporting member for said ampoule sealing members, and conveyor means adjacent said ampoule removing means for conveying filled and sealed ampoules away from said apparatus and for conveying unwashed ampoules to said apparatus and loading into said ampoule holding members.

2. Apparatus as claimed in claim 1 in which the casing defining the first of said zones extends from a position laterally of the cylindrical axis of said cylinder to a point past a point vertically below the cylindrical axis of said cylinder, and the outlet for said zone is positioned vertically below the cylindrical axis of said cylinder.

3. Apparatus as claimed in claim 1 in which a plurality of wash fluid injecting members is mounted on alternate supporting members in the first of said zones, there being one injecting member on each supporting member for each position in which an ampoule is held in said row holding members.

4. Apparatus as claimed in claim 1 in which said supporting members comprise a header connected to each of said injecting members, and said conduit means are connected to said headers.

5. Apparatus as claimed in claim 1 in which said liquid injecting means comprise dosing means for dosing a predetermined amount of liquid from said injecting means.

6. Apparatus for processing groups of ampoules comprising a cylinder rotatably mounted about its cylindrical axis, a plurality of ampoule row holding members mounted on the circumference of said cylinder, a plurality of supporting members circumferentially positioned around said cylinder and spaced radially from said cylinder and each extending parallel to the surface of said cylinder in a position corresponding to one of said ampoule row holding members, reciprocating means on which said supporting members are mounted for reciprocating said supporting members radially toward and away from said cylinder, a casing around said supporting members spaced radially outwardly thereof, partitions extending radially inward from said casing to adjacent said cylinder dividing said casing circumferentially into a plurality of zones each having a plurality of supporting members therein, each of said zones having an outlet therefrom, a plurality of wash fluid injecting members mounted on at least the supporting member at one end of the first of said zones, there being one injecting member for each position in which an ampoule is held in said ampoule row holding members, conduit means connected to said wash fluid injecting members for supplying wash fluid thereto, a plurality of gas injecting members on each of the remainder of the supporting members in the first of said zones, there being one gas injecting member for each position in which an ampoule is held in said ampoule row holding member, gas conduit means connected to said gas injecting members for supplying gas thereto, a further plurality of gas injecting members on the supporting members in the second and third of said zones, there being one injecting member for each position in which an ampoule is held in said ampoule row holding members, hot gas conduit means connected to said gas injecting members in the second of said zones, cold gas conduit means connected to said gas injecting members in the third of said zones, a still further plurality of gas injecting members on the supporting member at the corresponding end of the fourth of said zones, there being one gas injecting member for each position in which an ampoule is held in said ampoule row holding members, inert gas conduit means connected to said still further purality of gas injecting members, a plurality of liquid injecting means on another supporting member in the fourth of said zones, there being one liquid injecting member for each position in which an ampoule is held in said ampoule row holding members, and a plurality of ampoule sealing means on a supporting member at the corresponding end of the zone adjacent said fourth zone, there being one sealing means for each position in which an ampoule is held in said ampoule row holding members.

7. Apparatus for processing groups of ampoules comprising a cylinder rotatably mounted about its cylindrical axis, a plurality of ampoule row holding members mounted on the circumference of said cylinder, a plurality of supporting members circumferentially positioned around said cylinder and spaced radially from said cylinder and each extending parallel to the surface of said cylinder in a position corresponding to one of said ampoule row holding members, reciprocating means on which said supporting members are mounted for reciprocating said supporting members radially toward and away from said cylinder, a casing around said supporting members spaced radially outwardly thereof, partitions extending radially inward from said casing to adjacent said cylinder dividing said casing circumferentially into a plurality of zones each having a plurality of supporting members therein, each of said zones having an outlet therefrom, a plurality of wash fluid injecting members mounted on at least the supporting member at one end of the first of said zones, there being one injecting member for each position in which an ampoule is held in said ampoule row holding members, conduit means connected to said wash fluid injecting members for supplying wash fluid thereto, a plurality of gas injecting members on each of the remainder of the supporting members in the first of said zones, there being one gas injecting member for each position in which an ampoule is held in said ampoule row holding member, gas conduit means connected to said gas injecting members for supplying gas thereto, a further plurality of gas injecting members on the supporting members in the second and third of said zones, there being one injecting member for each position in which an ampoule is held in said ampoule row holding members, hot gas conduit means connected to said gas injecting members in the second of said zones, cold gas conduit means connected to said gas injecting members in the third of said zones, a still further plurality of gas injecting members on the supporting member at the corresponding end of the fourth of said zones, there being one gas injecting member for each position in which an ampoule is held in said ampoule row holding members, an inert gas conduit means connected to said still further plurality of gas injecting members.

References Cited in the file of this patent

UNITED STATES PATENTS

| | | |
|---|---|---|
| 1,925,502 | Schaeffer | Sept. 5, 1933 |
| 2,838,893 | Sickel | June 17, 1958 |